United States Patent
Edwards et al.

(10) Patent No.: US 8,701,175 B2
(45) Date of Patent: Apr. 15, 2014

(54) METHODS, DEVICES, SYSTEMS AND COMPUTER PROGRAM PRODUCTS FOR PROVIDING SECURE COMMUNICATIONS BETWEEN MANAGED DEVICES IN FIREWALL PROTECTED AREAS AND NETWORKS SEGREGATED THEREFROM

(75) Inventors: Anthony Van Vechten Edwards, Durham, NC (US); James Talmage Doble, Cary, NC (US); Steven Harry Roberts, Concord, NC (US)

(73) Assignee: Tavve Software Company, Morrisville, NC (US)

( * ) Notice: Subject to any disclaimer, the term of this patent is extended or adjusted under 35 U.S.C. 154(b) by 2701 days.

(21) Appl. No.: 11/069,484

(22) Filed: Mar. 1, 2005

(65) Prior Publication Data

US 2006/0200547 A1 Sep. 7, 2006

(51) Int. Cl.
*H04L 29/06* (2006.01)
(52) U.S. Cl.
USPC .............. 726/11; 726/16; 726/21; 726/27; 709/223; 709/231; 709/244; 713/153
(58) Field of Classification Search
USPC .......................................... 726/11
See application file for complete search history.

(56) References Cited

U.S. PATENT DOCUMENTS

| | | | | |
|---|---|---|---|---|
| 5,987,513 A | * | 11/1999 | Prithviraj et al. | 709/223 |
| 7,299,353 B2 | * | 11/2007 | Le Pennec et al. | 713/159 |
| 2003/0069848 A1 | * | 4/2003 | Larson et al. | 705/50 |
| 2004/0268151 A1 | * | 12/2004 | Matsuda | 713/201 |
| 2005/0108379 A1 | * | 5/2005 | Gray et al. | 709/223 |
| 2006/0150243 A1 | * | 7/2006 | French et al. | 726/11 |
| 2006/0190570 A1 | * | 8/2006 | Booth et al. | 709/220 |

* cited by examiner

*Primary Examiner* — Hadi Armouche
*Assistant Examiner* — Bryan Wright
(74) *Attorney, Agent, or Firm* — Myers Bigel Sibley & Sajovec

(57) ABSTRACT

Methods, devices, systems and computer program products for providing secure communications between managed devices in a firewall protected area defined by a firewall and a network management station (NMS) in a network segregated from the firewall protected area are provided. Management information associated with managed devices in the firewall protected area is obtained from the managed devices by a de-militarized zone (DMZ) controller. The obtained management information is transmitted from the DMZ controller through the firewall to a gateway module associated with the NMS. Communications between the DMZ controller and the gateway module are enabled by a single firewall rule.

49 Claims, 11 Drawing Sheets

METHODS, DEVICES, SYSTEMS AND COMPUTER PROGRAM PRODUCTS FOR PROVIDING SECURE COMMUNICATIONS BETWEEN MANAGED DEVICES IN FIREWALL PROTECTED AREAS AND NETWORKS SEGREGATED THEREFROM

FIELD OF THE INVENTION

The present invention relates to network communications and, more particularly, to network security.

BACKGROUND OF THE INVENTION

The proliferation of the use of the Internet by businesses for retailing, business to business communications and/or having a Web presence for marketing has significantly increased problems faced by those who manage the internal networks of those businesses. In particular, more and more businesses are implementing de-militarized zones (DMZs), or firewall protected areas, that may sit between, for example, the company's network operation center (NOC) and the Internet. In other words, the NOC is segregated from the DMZ. For example, DMZs are being established between cooperating businesses. Businesses may need to share information, process orders or manage inventory between them. In order to accomplish these tasks, the different companies may need access to the same systems. The common network configuration for this shared environment may use a set of network computing devices that are separated by firewalls from both companies so that each can access the common systems, but not have access to the others private networks. Management of the DMZs provides a unique problem for those that manage the networks, because the firewall typically blocks management traffic.

DMZs may also be used within businesses to segment user communities for security purposes. For example, a company may want to keep its accounting department securely separated from its engineering department. The use of a DMZ may decrease the risk of losses due to corporate espionage, computer hacking, malicious employee action and the like. Thus, as businesses become more security conscious, the use of DMZs is becoming more prevalent. As the need for DMZs increases, the need to manage the devices within these areas generally also increases.

A network operations center (NOC) is typically the center of network management activity within a company. The NOC, especially in large company, is typically a sophisticated and complex combination of hardware, software and personnel. In many cases, the NOC is responsible for managing servers, networking equipment, operating systems, and software applications. Thus, it is typically an on-going challenge for NOC personnel to manage the company's environment no matter how it is configured or segregated. Some companies may have multiple NOCs depending on how they manage their environment. For example, NOCs may be separated geographically, by management function, for purposes of segregation and the like. The use of multiple NOCs may further complicate the management of these networks for NOC personnel.

To properly manage a network the NOC typically has the ability to probe and collect information from the network devices in order to monitor them properly. Electronic attacks on a company's network(s) from outside the company's network as well as from within the company's network are rapidly becoming a major concern for network security personnel. Thus, the security personnel typically try to decrease access to and from any area or limit communications that could compromise the security of the network.

Thus, a conflict arises between the NOC personnel and the security personnel. In particular, the conflict generally arises due to the requirements of the NOC to probe and collect information from the network devices and the need for network security personnel to limit communication to and from any area that may compromise security. In other words, problems may arise due to network segregation, which may cause problems when management information needs to be conveyed between segregated areas, for example, the NOC and the DMZ.

In particular, the DMZ is inherently insecure as it allows the outside world to access at least a portion of the company's network. Thus, the conflict arises here from the security team's interest in securing the company's network from being accessed through the DMZ and the NOCs need to manage the entire private network including devices located in the DMZ. Accordingly, the NOC needs some ability to view the devices in the DMZ, collect data from these devices and monitor these devices for operability, without creating a security breach incompatible with the mission of the security personnel. Furthermore, companies may use a variety of network management tools, for example, HP OpenView, IBM NetView, Micromuse NetCool, CA Unicenter, Concord NetHealth, NetScout nGenius and the like, to manage their networks. Many times one company will use multiple tools from different vendors; thus, there may be a need for multiple tools to be able to manage devices across the company's network and possibly within a DMZ itself.

To address the problems discussed above, management related network traffic may be allowed through the firewall to monitor the DMZ devices. For example, the firewall could be configured to allow communications between the DMZ devices and a network management station (NMS) in the company's internal network. Thus, the NMS could use, for example, internet control message protocol (ICMP) and simple network management protocol (SNMP) polling across the firewall to communicate with devices in the DMZ through the firewall to determine, for example, if the devices are available. However, although this approach may be acceptable to the NOC personnel, the security team may object to this approach because ICMP and SNMP are typically very insecure protocols, which can be, for example, spoofed by hackers to send potentially harmful information directly to the NMS.

Another approach that may be used to address the problems discussed above would be to place vendor proprietary agents/tools in the DMZ. The tools offered by various vendors vary; however, there are two main types of tools. In particular, a remote polling station within the DMZ and agents residing on the DMZ devices themselves. If a remote polling station is used, the remote polling station may be configured to poll the devices in the DMZ and send the responses back to the NMS. To enable this approach, a small number of firewall ports may be configured to allow direct communication between the polling station and the NMS. This approach may be acceptable to the security team if the number of firewall ports is not excessive and encrypted TCP connections are used. However, NOC personnel may object to this solution if they use multiple network management tools from several vendors, as a single vendor remote polling station may not be sufficient.

If agents residing on the DMZ devices themselves are used, the agents residing on the DMZ devices would need to be individually installed and maintained on each DMZ device. The NMS could then communicate with each agent to check the status of each DMZ device. Thus, the firewall would need to be configured to allow communication between each DMZ device and the NMS. The amount of configuration needed for each vendor agent to communicate with the NMS may be excessive, which may make this solution unacceptable to the security personnel. In particular, the firewall configuration may need to be modified for each new DMZ device, adding complexity and increasing the number of connections through the firewall. This solution may also be unacceptable to the NOC personnel, as it requires deployment and configuration of an agent for each device. The use of individual agents may also force the NOC to use a particular vendor tool set, which may make it difficult to change vendors in the future or support a plurality of customer DMZ access tools.

SUMMARY OF THE INVENTION

Some embodiments of the present invention include methods, devices, systems and computer program products for providing secure communications between managed devices in a firewall protected area defined by a firewall and a network management station (NMS) in a network segregated from the firewall protected area. A de-militarized zone (DMZ) controller obtains management information associated with managed devices in the firewall protected area from the managed devices. The obtained management information is transmitted from the DMZ controller through the firewall to a gateway module associated with the NMS. Communications between the DMZ controller and the gateway module are enabled by a single firewall rule.

In further embodiments of the present invention, transmitting may include managing a flow of the obtained management information. In particular, the flow of the obtained management information to the gateway module may be throttled. Syntax of the obtained management information may be verified before the obtained management information is transmitted to the gateway module. The obtained management information may be buffered and verified before the buffered management information is transmitted to the gateway module. A rate of receipt of the obtained management information at the DMZ controller may be monitored and the obtained management information may be discarded if the rate exceeds a predefined threshold.

In still further embodiments of the present invention, the obtained management information may be transmitted from the gateway module to the NMS in the form of a simple network management protocol (SNMP) trap. In certain embodiments of the present invention a SNMP request may be generated in the form of a SNMP protocol data unit (PDU) at the NMS including a community string. The community string may include a target community string, an identification of a DMZ controller and a target hostname. The identification of the DMZ controller may be an identification of a plurality of DMZ controllers.

In some embodiments of the present invention, the SNMP request may be received at the gateway module from the NMS and analyzed to determine an identity of the DMZ controller identified in the community string. A connection may be established between the gateway module and the determined DMZ controller identified in the community string and the SNMP request may be transmitted to a target host identified by the target hostname in the community string through the DMZ controller using the established connection. In certain embodiments of the present invention, a version 1 or version 2C SNMP PDU may be received and the version 1 or version 2C SNMP PDU may be converted into a version 3 SNMP PDU. Thus, the version 3 SNMP PDU may be transmitted from the determined DMZ controller to the target host.

In further embodiments of the present invention, an SNMP response in the form of an SNMP PDU may be received from the target host at the DMZ controller. The SNMP response may be converted into an intermediate form at the DMZ controller and transmitted to the gateway module over the established connection. The intermediate form of the SNMP response may be converted back to an SNMP PDU form at the gateway module and transmitted to the NMS.

In still further embodiments of the present invention, the obtained management information may be encrypted and the encrypted management information may be transmitted through the firewall to the gateway module. Problems associated with at least one managed device may be diagnosed at the DMZ controller and the diagnosed problems may be transmitted to the gateway module.

Some embodiments of the present invention provide methods for providing secure communications between managed devices in a firewall protected area defined by a firewall and a NMS in a network segregated from the firewall protected area. Management information associated with the at least one managed device may be received at the DMZ controller in the firewall protected area from the at least one managed device in the firewall protected area. A flow of the received management information may be managed before the received management information is transmitted from the DMZ controller through the firewall to a gateway module associated with the NMS.

Further embodiments of the present invention provide methods for communicating SNMP requests and responses through a firewall between a NMS in a network and managed devices in a firewall protected area defined by the firewall associated with the network. A SNMP request is generated in the form of a PDU at the NMS including a community string. The community string may include a target community string, an identification of a DMZ controller and a target hostname associated with one of the managed devices.

Still further embodiments of the present invention, methods for providing secure communications between managed devices in a firewall protected area defined by a firewall and a network management station (NMS) in a network segregated from the firewall protected area. A gateway module associated with the NMS receives management information from a DMZ controller through the firewall. The management information is associated with at least one managed device in the firewall protected area and is obtained from the at least one managed device. Communications between the DMZ controller and the gateway module are enabled by a single firewall rule.

Some embodiments of the present invention provide methods for communicating simple network management protocol (SNMP) requests and responses through a firewall between a network management station (NMS) in a network and managed devices in a firewall protected area defined by the firewall associated with the network. An SNMP request is received at a DMZ controller in the form of a protocol data unit (PDU) from the NMS. The SNMP request includes a community string including a target community string, an identification of a de-militarized zone (DMZ) controller and a target hostname associated with one of the managed devices.

While the invention has been described above primarily with respect to method aspects of the invention, devices, systems and/or computer program products are also provided herein.

DETAILED DESCRIPTION OF THE PRESENT INVENTION

Figure 1:
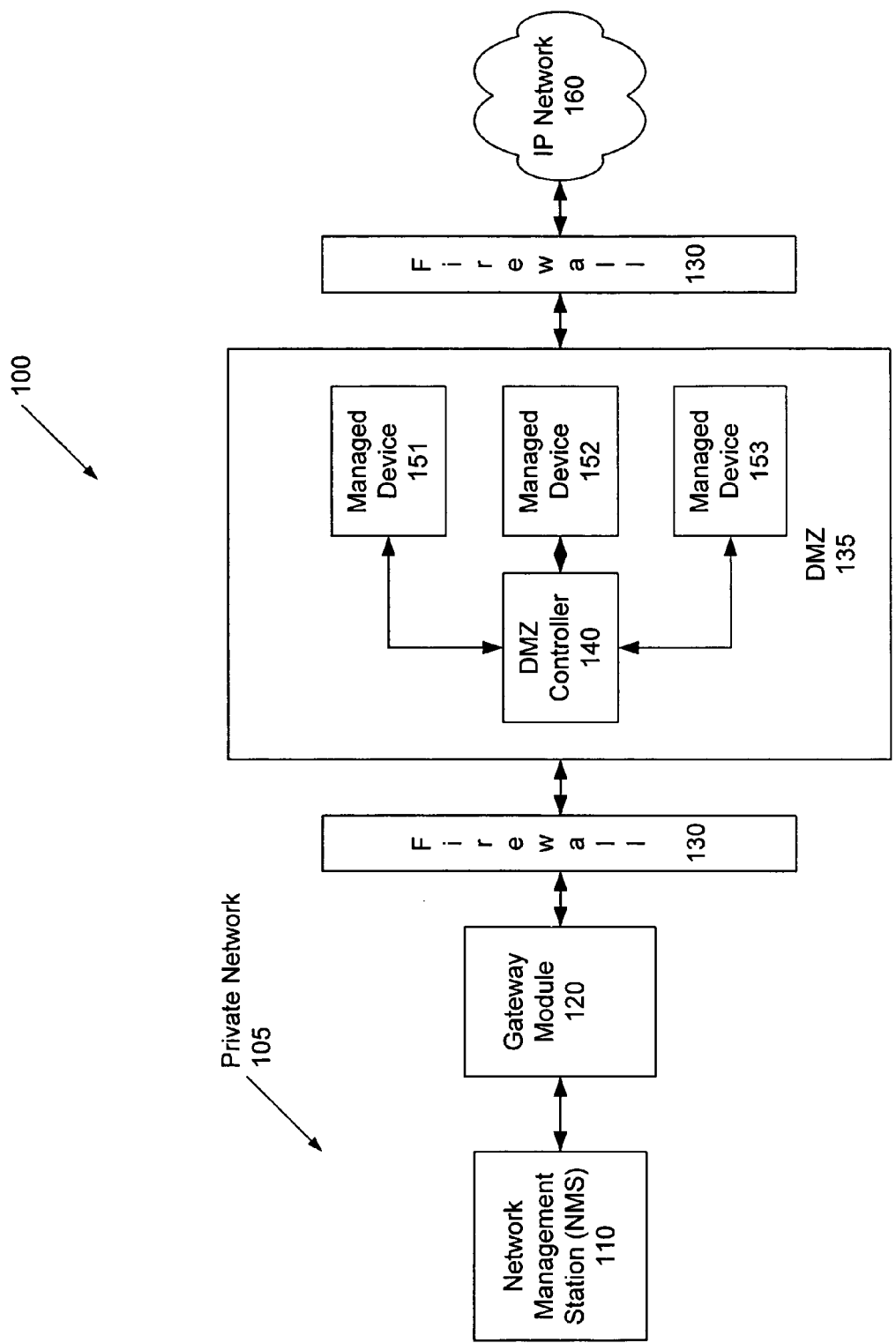
FIG. 1 is a block diagram of networks including a network management station (NMS) and a de-militarized zone (DMZ) according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated selectivity features, integers, steps, operations, elements, and/or components, but do not preclude the presence or addition of one or more other selectivity features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or flowchart illustrations of methods, devices, systems and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory) and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that, in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Various embodiments of the present invention will now be described with reference to FIGS. 1 through 12. As discussed herein, some embodiments of the present invention provide methods, devices, systems and computer program products for providing secure communications between managed devices in a firewall protected area defined by a firewall and a network management station (NMS) in a network segregated from the firewall protected area, but not within the firewall protected area. A de-militarized zone (DMZ) controller is provided in the DMZ, i.e., the firewall protected area, that is configured to discover and poll one or more devices, for example, servers, routers, load balancers and the like, in the DMZ to obtain management information associated with the one or more devices. As used herein, "management information" includes, but is not limited to, network management traffic, for example, status data, management data, notification data and the like. The obtained management information is then communicated from the DMZ controller through a firewall to a gateway module associated with the NMS. Communication between the DMZ controller and the gateway module may be enabled by a single firewall rule, which will be discussed further below. In some embodiments of the present invention, the gateway may installed on the NMS. The communications between the DMZ controller and the gateway module may be encrypted to provide further security.

Accordingly, methods, devices, systems and computer program products according to some embodiments of the present invention may be acceptable to security personnel because only one firewall rule may be used and the data coming from the DMZ controller may be encrypted to add an extra level of security, as well as limit traffic to between two devices. Furthermore, methods, devices, systems and computer program products according to some embodiments of the present invention may also be acceptable to the NOC personnel because a mechanism may be provided that allows remote polling of the DMZ devices using a single application or device (DMZ controller), which may simplify configuration.

According to some embodiments of the present invention, the DMZ controller and the gateway module may be provided by ZoneRanger and Ranger Gateway products offered by Tavve Software Company of Morrisville, N.C. The DMZ controller, for example, ZoneRanger, may be compatible with any NMS, i.e., it may be vendor neutral. Thus, the NOC may be provided the flexibility to configure the gateway module to send the status of the DMZ devices to multiple network management tools within the private network. Furthermore, the vendor neutrality provided by some embodiments of the present invention also provides NOC personnel the ability to add equipment and/or change equipment (network management tool sets) without changing the way the DMZ devices are managed.

Details with respect to some embodiments of the present invention will be discussed further below with respect to FIGS. 1 through 12. Referring now to FIG. 1, a block diagram of networks including a network management station (NMS) and a de-militarized zone (DMZ) according to some embodiments of the present invention will be discussed. As illustrated in FIG. 1, the network 100 may include a private network 105, a de-militarized zone (DMZ) 135 (or firewall protected area) associated with the private network 105 and an Internet protocol (IP) network 160. As used herein, a "private" network refers to a network behind at least one firewall. As further illustrated in FIG. 1, a firewall 130 sits between the private network 105 and the DMZ 135 and between the DMZ 135 and the IP network 160. Thus, the DMZ 135 sits between the private network 105 and the IP network 160 and the presence of the DMZ 135 may provide an added layer of security relative to the IP Network 160 for the information stored in the private network 105.

In particular, the private network 105 can include a network management station (NMS) 110 and a gateway module 120 according to some embodiments of the present invention. It will be understood, that although FIG. 1 only includes a single NMS and a single gateway module 120, more than one NMS or gateway module may be provided without departing from the scope of the present invention. Furthermore, although the gateway module 120 is depicted as being separate from the NMS 110, the gateway module 120 may be integrated with the NMS 110 without departing from the scope of the present invention. In some embodiments of the present invention, the gateway module 120 may be provided by a Ranger Gateway product provided by Tavve Software Corporation.

As further illustrated in FIG. 1, the DMZ 135 may include a DMZ controller 140 and one or more managed devices 151, 152 and 153 (hosts), for example, servers, routers, load balancers and the like. In some embodiments of the present invention, the DMZ controller 140 may be provided by, for example, a ZoneRanger product from Tavve Software Corporation. Although embodiments of the present invention illustrated in FIG. 1 include a single DMZ controller 140, embodiments of the present invention are not limited to this configuration. For example, the gateway module 120 may be configured to communicate with two or more DMZ controllers 140 or a group or plurality of DMZ controllers 140 without departing from the scope of the present invention.

The DMZ controller 140 may be configured to communicate with the gateway module 120 through the firewall 130. The managed devices 151, 152 and 153 may also be configured to communicate with the IP network 160 through the firewall 130. Furthermore, the DMZ controller 140 may be configured to discover and/or poll one or more of the managed devices 151, 152 and 153 (DMZ devices) in the DMZ 135 to obtain management information associated with the one or more managed devices 151, 152 and 153. The DMZ controller 140 may be further configured to transmit the management information obtained with respect to the devices 151, 152 and 153 to the gateway module 120 in the private network 105 through the firewall 130. Communication between the DMZ controller 140 and the gateway module 120 may be enabled using a single firewall rule and through a single firewall port, details of which will be discussed further below. In other words, the DMZ controller 140 may perform network management functions. As used herein, "network management" refers to, among other things, actively polling devices, interfaces and applications for status and notifying network management software in the Network Operations Center (NOC) of any problems. The NMS 110 may be located within the NOC.

The management information obtained by the DMZ controller 140 and transmitted to the gateway module 120 may be encrypted to provide an added level of security. Methods of encrypting data streams are known to those having skill in the art and, therefore, specific encryption methods are not discussed in detail herein. Furthermore, the gateway module 120 may be configured to transmit the received management information to the NMS 110, for example, in the form of an SNMP trap or any other management traffic.

SNMP traps are a form of communication between an agent on, for example, a managed device 151, 152 and 153, provided for in SNMP. SNMP traps enable a device to notify the NMS of events (management information) by way of an unsolicited SNMP message. In particular, as the NMS may be responsible for the management of a large number of devices, and each device may have a large number of interface, it may be impractical for the NMS to poll or request information from every interface on every device. Thus, the SNMP trap (a trap of an event) allows the NMS to be informed of management information associated with the managed devices 151, 152 and 153 without solicitation.

In some embodiments of the present invention, the DMZ controller 140 may be configured to manage the flow of transmitted management information to the NMS to provide an added level of security. For example, the DMZ controller 140 may be configured to throttle back (limit) the amount of management information forwarded to the NMS 110 through the gateway module 120. Thus, for example, a hacker trying to overwhelm the NMS 110 with meaningless messages may not be able to do so because the DMZ controller 140 may be configured to limit the amount of information actually forwarded to the NMS 110 at a particular time interval. For example, the DMZ controller 140 may be configured to filter out SNMP traps to lessen the load on the NMS 110, i.e., the DMZ controller 140 may filter the useless traps that the NMS 110 does not need to process.

In further embodiments of the present invention, the DMZ controller 140 may be configured to validate a syntax of the obtained management information before transmitting the management information to the gateway module 120. In other words, the DMZ controller 140 may validate that the management information being forwarded to the gateway module 120 are protocol correct. In still further embodiments of the present invention, the DMZ controller 140 may be configured to store the management information received from the managed devices 151, 152 and 153 before transmitting the information. Thus, the DMZ controller 140 can analyze the buffered management information to determine if it should be forwarded through the firewall 130. By way of further example, the DMZ controller 140 may be configured to monitor a rate at which management information is received at the DMZ controller 140 from the managed devices 151, 152 and 153. It will be understood that each managed device 151, 152 and 153 may have a specific rate associated therewith. If the information is being received at a rate higher per source (managed device) than a predetermined threshold for the particular source (managed device), the information may be discarded by the DMZ controller 140.

Thus, according to some embodiments of the present invention, in addition to encrypting the information transmitted from the DMZ controller 140 to the gateway module 120, the DMZ controller 140 may be configured to apply one or more of the flow control mechanisms discussed above. Implementation of one or more of the flow control and/or validity checking mechanisms may provide yet another added level of security for the information stored at the private network 105 to increase the likelihood of the validity of the management traffic.

In some embodiments of the present invention, the NMS 110 may be configured to generate a SNMP protocol data unit (PDU) (SNMP request) including a community string according to some embodiments of the present invention. Community strings, according to some embodiments of the present invention, include a target community string, an identification of a DMZ controller and a target hostname. In certain embodiments of the present invention, the community string may further include a target port number. If no target port number is specified, a default port may be specified, for example, udp/161.

A community string according to some embodiments of the present invention may be, for example, public@ZR13@devX. Public is a common default community string, ZR13 specifies ZoneRanger number 13 (DMZ controller 13) and the target hostname is devX, for example, managed device 151. The specification of the DMZ controller 140 can also be a specification of a group or plurality of equivalent DMZ controllers without departing from the scope of the present invention. As used herein, "equivalent DMZ controller" refers to a DMZ controller having a similar or equal capability of performing an operation on the target device. An SNMP request according to some embodiments of the present invention does not include proxy bindings like conventional SNMP requests.

The gateway module 120 may be configured to receive the SNMP PDU from the NMS 110 and to analyze the SNMP PDU to determine the DMZ controller(s) 140 identified in the community string, for example, ZR13. A connection may be established with the DMZ controller 140 identified in the community string and the PDU may be transmitted, through the determined DMZ controller 140, to a target host (managed device 151, 152, 153) identified by the target hostname in the community string, for example, devX.

In some embodiments of the present invention, the SNMP PDU may be received at the routing gateway 120 as a version 1 or version 2C SNMP PDU. The SNMP PDU may be converted into a version 3 SNMP PDU and the version 3 SNMP PDU may be transmitted from the determined DMZ controller 140 to the target host. Versions 1 and 2C are generally less secure than version 3, so it may be beneficial to have version 3 SNMP in the DMZ 135. However, company's do not typically want to expend the money to upgrade the entire private network 105 to communicate using SNMP version 3. Thus, the conversion of the SNMP PDU from version 1 and 2C to version 3 at the DMZ controller 140 may be beneficial. Utilization of the gateway module 120 and the DMZ controller 140 as an SNMP proxy will be discussed further below with respect to FIGS. 2A and 2B.

Figure 2A:
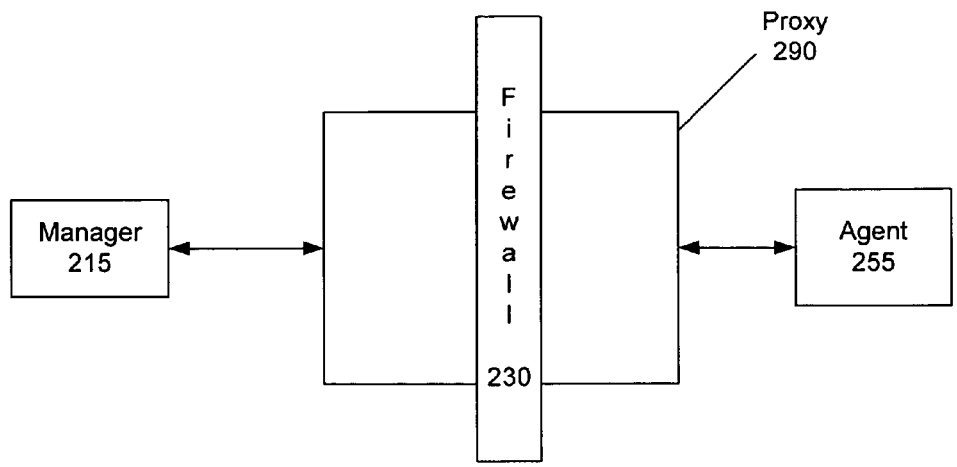
FIGS. 2A and 2B are block diagrams illustrating networks including gateway modules and DMZs used as SNMP proxies according to some embodiments of the present invention.
Figure 2B:
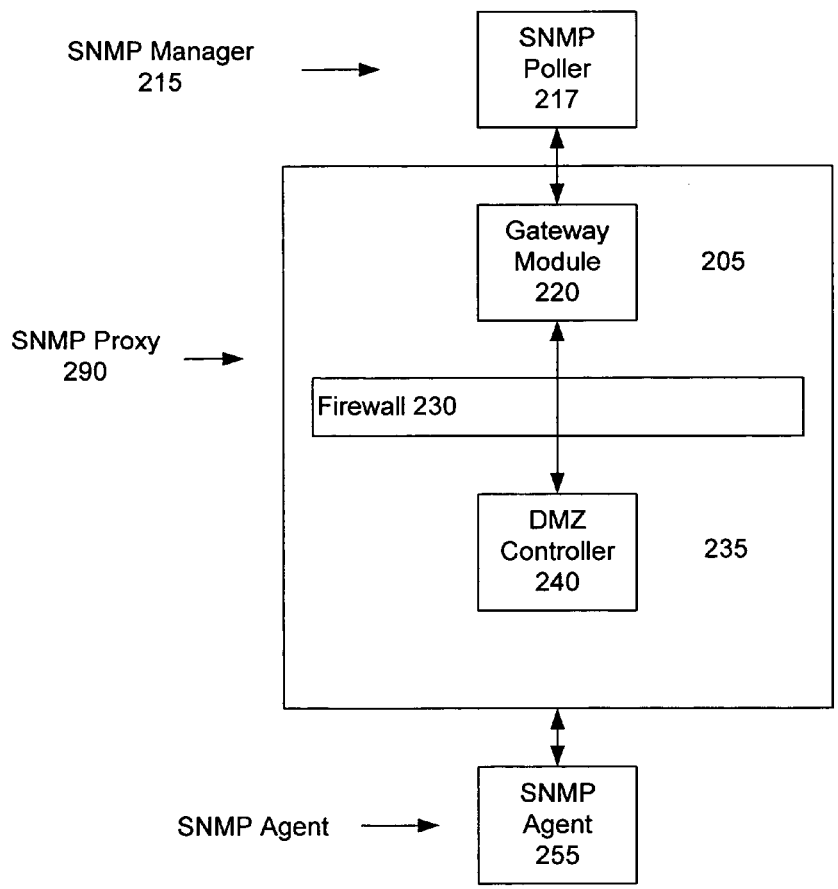

Referring now to FIGS. 2A and 2B, block diagrams of networks including an SNMP proxy according to some embodiments of the present invention will be discussed. It will be understood that, although specific port numbers are described herein, embodiments of the present invention are not limited to the port numbers specifically described. Any ports capable of providing the functionality described herein may be used without departing from the scope of the present invention.

As illustrated in FIG. 2A, a manager 215 communicates with an agent 255 through the firewall 230 using an SNMP proxy 290 according to some embodiments of the present invention. As further illustrated in FIG. 2A, the SNMP proxy 290 according to some embodiments of the present invention straddles the firewall 230. Furthermore, a first portion of the SNMP proxy 290 is provided by the gateway module 220 on the private network 205 side of the firewall 230 and a second portion of the SNMP proxy 290 is provided by the DMZ controller 240 on the DMZ 235 side of the firewall 230. The use of the gateway module 220 and the DMZ controller 240 as an SNMP proxy may allow the SNMP manager 215 (part of the NMS 210) to query SNMP agents 255 (associated with managed devices 251, 252 and 253 in the DMZ 235), that were previously unreachable by the SNMP manager 215 due to firewall filtering. It will be understood that, although only a single agent 255 is depicted in FIG. 2A, multiple agents may be provided without departing from the scope of the present invention.

Most private networks typically have an SNMP manager 215, a firewall 230 and a device agent(s) 255. For example, an SNMP manager 215 may be a product, such as OpenView NNM, Tivoli NetView, CA Unicenter, InfoVista Server, NetScout nGenius, Concord eHealth, Micromuse NetCool and the like. It will be understood that these and other known SNMP managers may be used in combination with an SNMP proxy mechanism 290 according to some embodiments of the present invention, which will be described further herein. The manager 215 may be separate from or part of the NMS (110 FIG. 1) without departing from the scope of the present invention.

In some embodiments of the present invention, the firewall 230 may be provided by various vendors, such as Cisco, Nokia, Checkpoint and the like without departing from the scope of the present invention. In further embodiments of the present invention, the firewall 230 may be a de facto firewall because network traffic may be routed through a virtual private network (VPN), associated with the private network that has traffic restrictions on SNMP and ICMP.

Referring now to FIGS. 2A and 2B, as discussed briefly above, only a single firewall rule is used according to some embodiments of the present invention. In other words, the gateway module 220 and the DMZ controller 240 may communicate using, for example, Tavve Distributed Management Protocol (TDMP) on the tcp/4848 port. The single firewall rule is created to allow this communication through the firewall, i.e., to allow the DMZ controller 240 and the gateway module 220 to initiate connections to each other on the tcp/4848 port. For example, if a Cisco PIX firewall is being used by the private network, the configuration lines required to allow this communication are generally as follows, assuming 10.1.1.10 is the IP address of the DMZ controller 240 in the DMZ, 10.2.1.103 is the IP address of the gateway module 220 of the private network and 10.1.1.200 is an available IP address on the subnet, which is the network address translation (NAT) address for the NMS:

static (inside, outside) 10.1.1.200.10.2.1.103 netmask 255.255.255.255 0 0 conduit permit tcp host 10.1.1.200 eq 4848 host 10.1.1.10. The command lines provided herein are for exemplary purposes only and embodiments of the present invention should not be limited to this configuration. Command lines according to embodiments of the present invention may vary, for example, based on the vendor and type of firewall. In the interest of brevity, each specific command line for each specific vendor/type pair will not be discussed herein. However, the command lines and the configuration thereof will be understood by those having skill in the art.

The agents 255 associated with the managed devices, for example, 151, 152 and 153 (of FIG. 1) of the DMZ 235 are typically unreachable from outside the DMZ 235 due to firewall security rules. For example, firewall security rules may prevent SNMP traffic (request and/or response) or ICMP traffic (request and/or response) to cross the firewall. In some embodiments of the present invention, the agents 255 may be enabled SNMP agents, routers, switches, load balancers and the like.

According to some embodiments of the present invention, the SNMP proxy mechanism is provided by a gateway module 220 and a DMZ controller 240. The gateway module 220 typically may reside on the NMS 110 (FIG. 1) with the SNMP manager 215. The gateway module 220 is typically installed on the NMS 210 and, once installed, the gateway module 220 listens on udp/4852 port. It will be understood that the gateway module 220 can be separate from the NMS without departing from the scope of the present invention. Furthermore, one or more DMZ controllers 240 may be provided in the DMZ or extranet, such as a VPN. Some embodiments of the present invention may provide DMZ controllers in pairs for redundancy purposes for increased reliability.

Referring now to FIG. 2B, a more detailed block diagram of an SNMP proxy 290 according to some embodiments of the present invention will be discussed. As illustrated in FIG. 2B, the SNMP manager 215 may include an SNMP poller 217 and the SNMP proxy 290 according to some embodiments of the present invention may include the gateway module 220 on a first side of the firewall 230 and a DMZ controller on a second side of the firewall 230. Generally, the SNMP proxy 290 is configured to accept SNMP requests (SNMP PDUs), for example, from the SNMP poller 217 of the SNMP manager 215, convert the SNMP request into an intermediate form at the gateway module 220 and convert the SNMP request back into SNMP format at the DMZ controller 240 inside the DMZ. Thus, in essence, the SNMP poller 217 may be able to poll devices in the DMZ without actually passing SNMP or ICMP requests across the firewall 230, which is typically not allowed because it may be a breach of security policy.

An exemplary request/response process will now be discussed with respect to FIG. 2B. The SNMP manager 215 generates at the SNMP poller 217 an SNMP version 1 or version 2C request as, for example, an Abstract Syntax Notation number One (ASN1) encoded SNMP PDU. The SNMP PDU is sent to udp/4852 on the gateway module 220. The request is a normal SNMP request including a community string according to some embodiments of the present invention. In particular, the community string may include the target community string, a string identifying the DMZ controller 240 or group or plurality of DMZ controllers 240, a target hostname (identification of the managed device(s)) and, optionally, the target port number. The syntax of the community string may be, for example, communitystring@zrname@agentaddress[:port].

For example, a common default community string is "public". If the target device's agent is "server13" and is managed by a DMZ controller 240 (ZoneRanger (ZR)) "zr201", the community string would be public@zr201@server13. In some embodiments of the present invention, the target device's agent's IP address may be used in place of its name to save a DNS lookup for the IP address. In further embodiments of the present invention, a pair of DMZ controllers 240 may be deployed for redundancy purposes. When targeting a pair of DMZ controllers 240, either DMZ controller 240 in the pair may be used. The gateway module 220 may be configured to select one of the DMZ controllers 240 in the pair. In these cases, the group name of the DMZ controllers 240 may be used in the community string. Furthermore, if the agent is not configured to listen on the standard udp/161 port, a port number may be specified, for example, public@zr201@server13:1167. Some data collection tools from particular vendors, for example, OpenView NNM and Tivoli NetView, do not generally allow the use of colons in community strings, thus, for these data collection tools, a vertical bar may be used in place of the colon.

It will be understood that in some embodiments of the present invention a pair of DMZ controllers 240 may be targeted. When targeting a pair of DMZ controllers 240, either DMZ controller 240 in the pair may be used. The gateway module 220 may be configured to select one of the DMZ controllers 240 in the pair. In particular, the gateway module 220 may select the DMZ controller 240 from the pair based on the receptiveness of the DMZ controller 240 for connection. The gateway module 240 may continue to use the same DMZ controller 240 until it fails. If the connection fails, the gateway module 220 may be configured to check for another receptive DMZ controller 240 in the pair or group.

The gateway module 220 listens on the udp/4852 port and accepts the SNMP PDU. The gateway module 220 analyzes the SNMP PDU's community string to determine which DMZ controller 240 (or group of DMZ controllers 240) has been identified. The gateway module 220 establishes a connection with the determined DMZ controller(s) 240. Communication over the established connection may be encrypted. The connection tunnels the SNMP request to the DMZ controller 240 and the DMZ controller 240 converts the request back into an SNMP PDU, which is sent to the SNMP agent 255 on the target host (managed device) identified in the community string. The SNMP PDU may be sent to the specified port (if any) or a default port, for example, udp/161.

In some embodiments of the present invention, the DMZ controller 240 may be configured to convert the SNMP version 1 or version 2C PDU into an SNMP version 3 PDU. As discussed above, SNMP version 3 is more secure, which is ideal for the DMZ environment. However, NOC and Security personnel may not want to upgrade the entire customer network to use version 3 SNMP. Thus, the conversion ability of the DMZ controller 240 may provide a solution that allows the private networks to continue using version 1 and 2C SNMP and provide the more secure version 3 SNMP in the DMZ.

Referring again to the example, when the target host's agent 255 (managed device's agent) responds, the DMZ controller 240 receives the SNMP PDU and converts it to an intermediate form. The DMZ controller 240 transmits the intermediate request over the established connection (through the tunnel) to the gateway module 220. The gateway module 220 converts the intermediate form back to an SNMP PDU, which is sent to the SNMP manager 215. Thus, the SNMP proxy 290, according to some embodiments of the present invention, receives SNMP on one end and transmits SNMP on the other end.

Referring again to FIG. 1, in some embodiments of the present invention, the DMZ controller 140 may be configured to further diagnose problems associated with one or more of the DMZ devices before informing the NMS 110 of the situation. For example, in some embodiments of the present invention, the DMZ controller 140 may be configured to discover devices, poll devices and/or perform root cause diagnosis on the devices when problems are found. Thus, many of the traditional functions of the NMS 110 may be delegated to the DMZ controller 140, which may reduce the amount of traffic flowing from the DMZ 135 to the private network 105. Furthermore, the DMZ controller 140 may be configured to poll the managed devices 151, 152 and 153 using SNMP, ICMP and/or TCP polling, which is not typically allowed through the firewall 130.

Thus, the DMZ controller 140 may be configured to poll the managed devices 151, 152 and 153 to determine if a problem exists. If a problem does arise, the DMZ controller 140 may be configured to diagnose the problem before informing the NMS 110 of the problem. For example, if the DMZ controller 140 has polled device 151, but has not received a ping response, the DMZ controller 140 may determine that the problem is a router situated between the DMZ controller 140 and the device 151. The DMZ controller 140 may then report a problem with the router (transmit information describing the diagnosed problem with the router) to the NMS 110.

As discussed above, with respect to FIG. 1, gateway modules 120 and DMZ controllers 140, according to some embodiments of the present invention, may provide secure communications between the DMZ and the private network. Furthermore, because the gateway module 120 can be loaded on any NMS, the DMZ controller 140 can work with any NMS. Thus, some embodiments of the present invention are compatible with a variety of management tools, regardless of the vendor. Accordingly, no equipment changes or upgrades may be necessary.

FIG. 1 illustrates one situation where a DMZ may be used according to some embodiments of the present invention. However, embodiments of the present invention are not limited to this configuration. Alternate configurations will now be discussed with respect to FIGS. 3 through 5. Like numbers in FIGS. 3 through 5 refer to like elements discussed with respect to FIG. 1, thus, details with respect to like numbered elements will not be discussed further herein.

Figure 3:
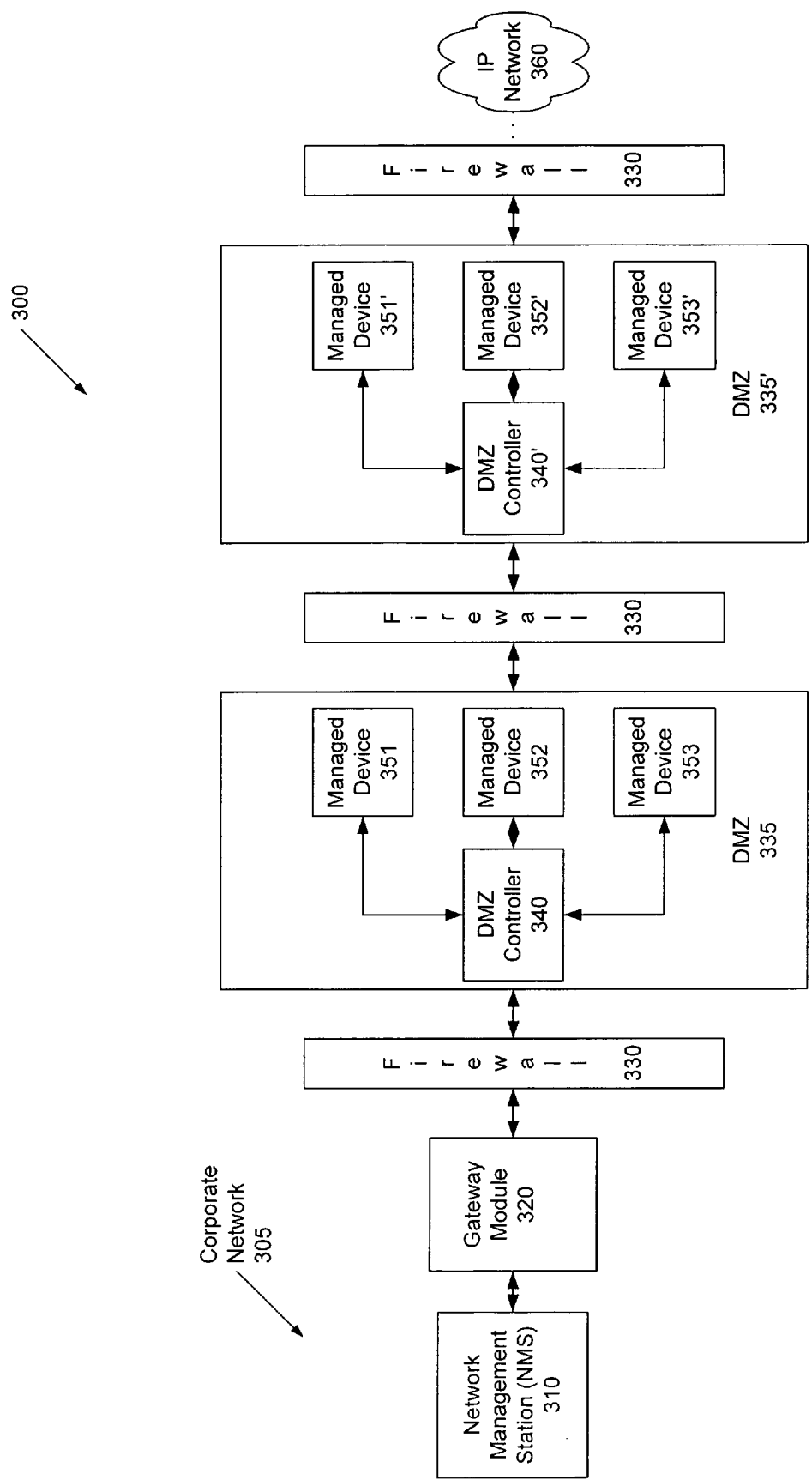
FIG. 3 is a block diagram of networks including a network management station (NMS) and a DMZ according to further embodiments of the present invention.

In some embodiments of the present invention, for example, embodiments of the present invention illustrated in FIG. 3, a series of DMZs 335, 335' defined by firewalls 330 may separate the private network 305 from the IP network 360. As illustrated in FIG. 3, each DMZ 335, 335' includes one or more DMZ controllers 340, 340' to manage the managed devices 351, 352, 353, 351', 352', 353', for example, the servers, load balancers, routers and the like. It will be understood that, although FIG. 3 includes a series of two DMZs 335, 335', embodiments of the present invention are not limited to this configuration. For example, three or more DMZs may be included in the series without departing from the scope of the present invention.

Figure 4:
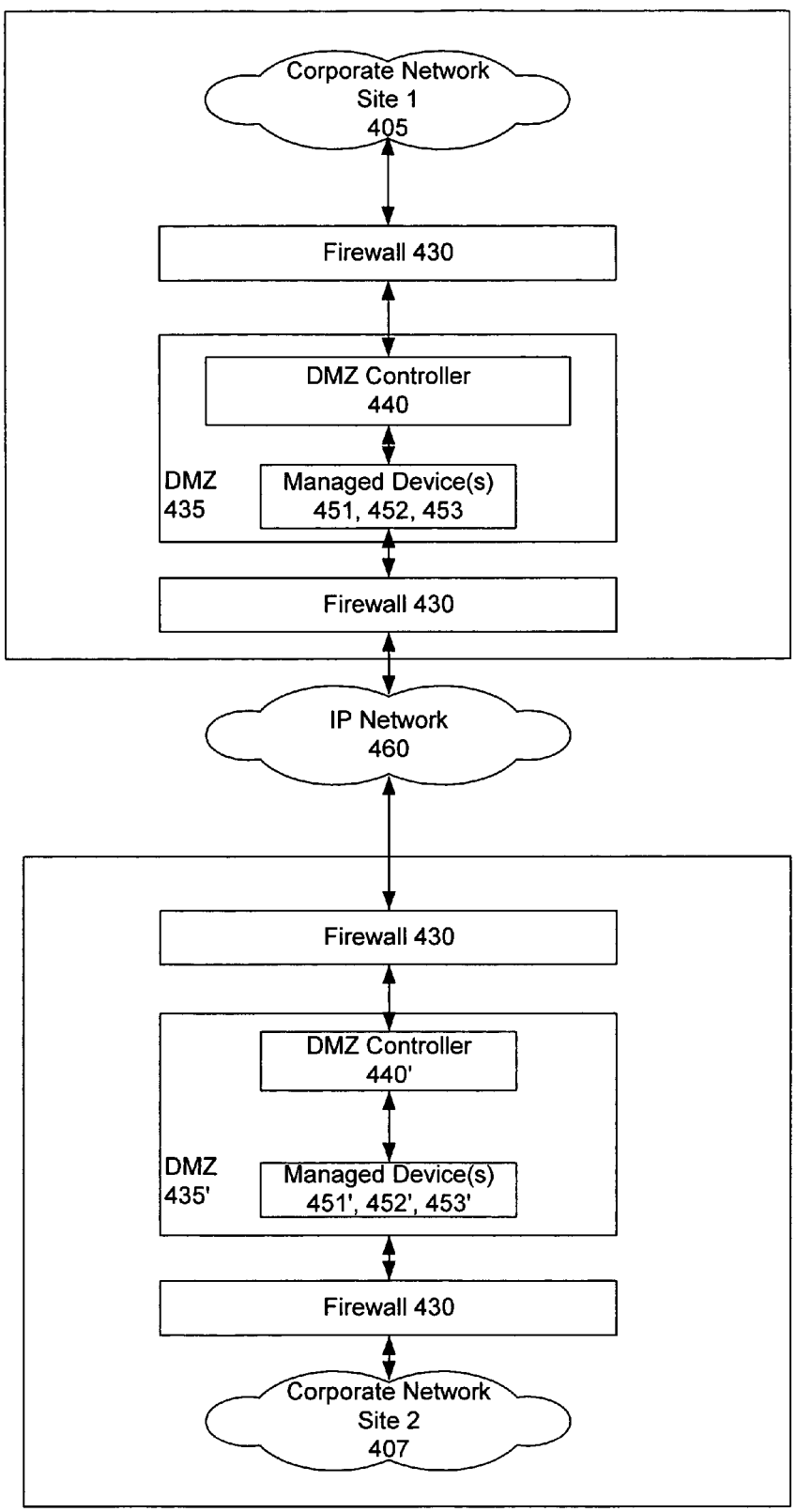
FIG. 4 is a block diagram of networks including multiple private network sites and DMZs according to still further embodiments of the present invention.

In some embodiments of the present invention, for example, embodiments of the present invention illustrated in FIG. 4, a buffer DMZ 435, 435' may be used to separate the IP network 460 from each site of the private network, for example, Private network Site 1 405 and Private network Site 2 407. As illustrated in FIG. 4, each DMZ 435, 435' includes one or more DMZ controllers 440, 440' to manage the managed devices 451, 452, 453, 451', 452', 453', for example, the servers, load balancers, routers and the like. It will be understood that, although FIG. 4 includes two corporate sites, embodiments of the present invention are not limited to this configuration. For example, three or more corporate sites may be provided each having a dedicated DMZ to separate the private network 405, 407 from the IP network 460.

Figure 5:
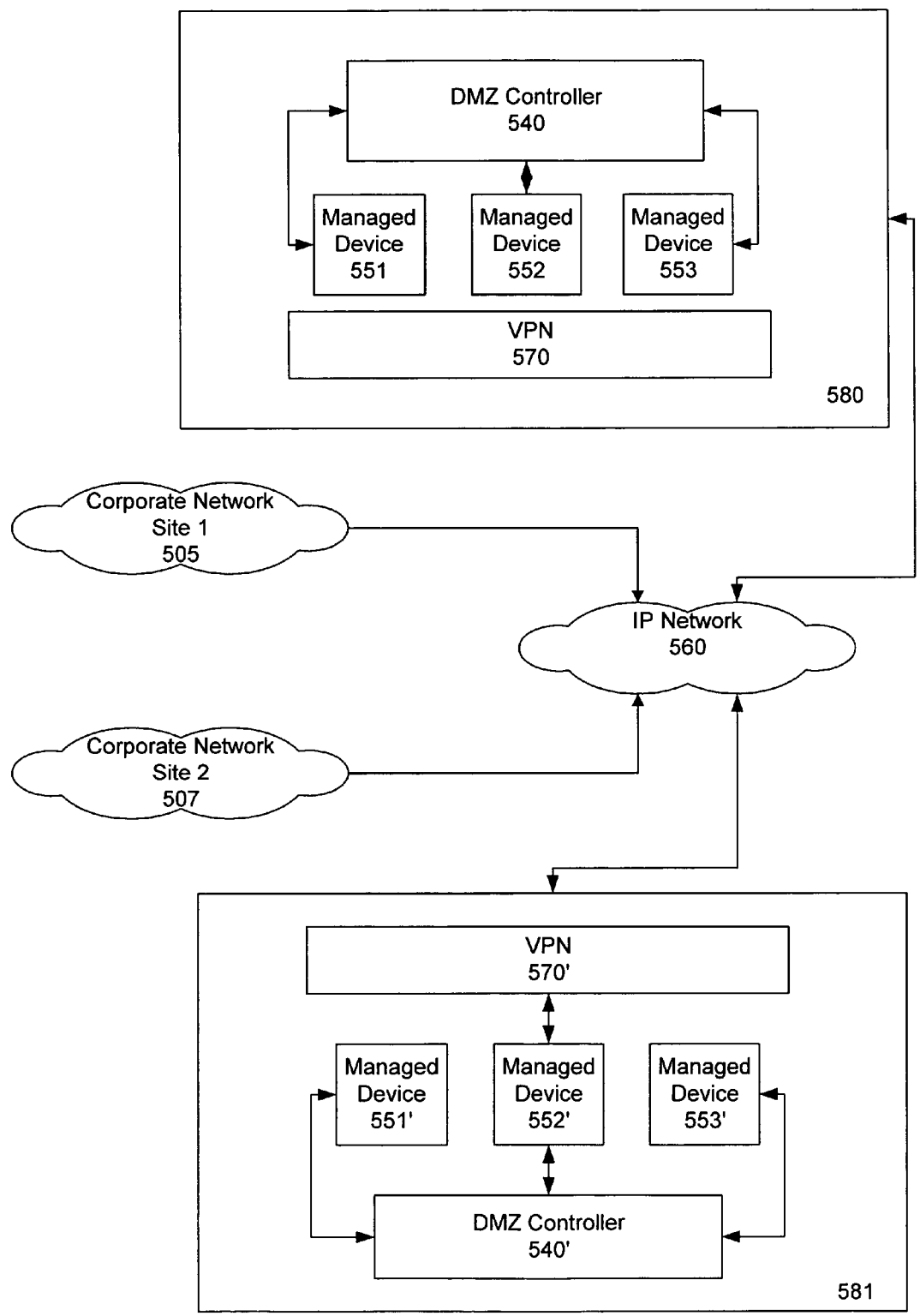
FIG. 5 is a block diagram of networks including multiple private network sites and DMZs according to some embodiments of the present invention.

In some embodiments of the present invention, for example, embodiments of the present invention illustrated in FIG. 5, each corporate site 505 and 507 may have an associated protected extranet. As illustrated in FIG. 5, each extranet 580 and 581 include a DMZ controller 540, 540' to manage servers, switches and the like. Thus, the DMZ controllers 540, 540' may separate the virtual private networks (VPNs) 570, 570' from the IP network 560.

Figure 6:
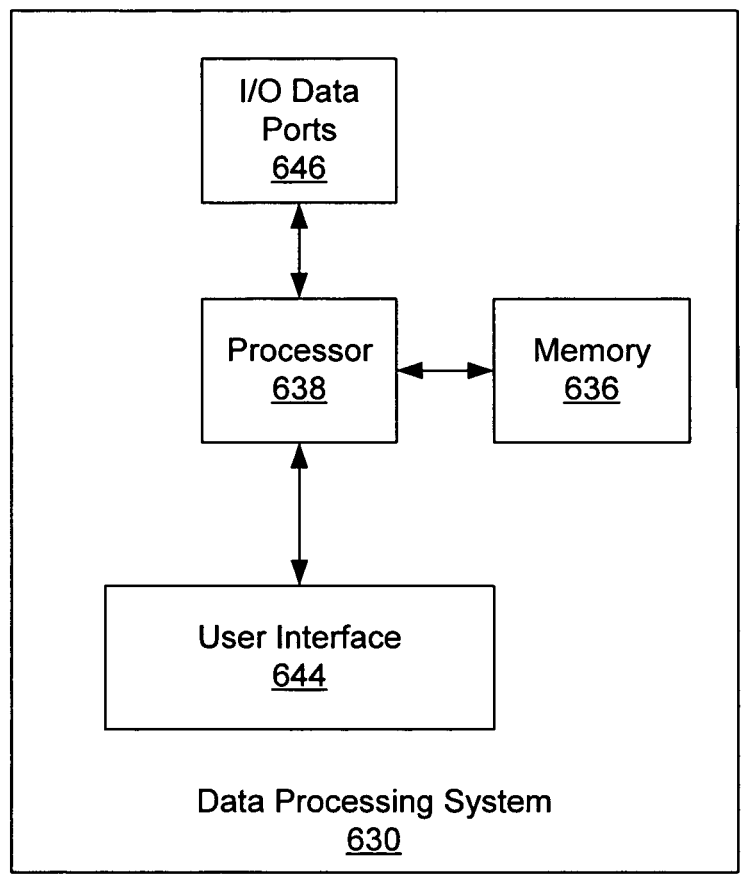
FIG. 6 is a block diagram of a data processing system suitable for use in, for example, DMZ controllers and/or gateway modules, according to some embodiments of the present invention.

Referring now to FIG. 6, a computing device or data processing system 630 configured in accordance with some embodiments of the present invention will be discussed. The data processing system 630, which may be incorporated in, for example, a personal computer, a PDA, a wireless terminal/phone, a smart appliance or the like, may include a user interface 644, including, for example, input device(s) such as a keyboard or keypad, a display, a speaker and/or microphone, and a memory 636 that communicate with a processor 638. The data processing system 630 may further include an I/O data port(s) 646 that also communicates with the processor 638. The I/O data port(s) 646 can be used to transfer information between the data processing system 630 and another computer system or a network using, for example, an Internet Protocol (IP) connection. These components may be conventional components such as those used in many conventional data processing systems, which may be configured to operate as described herein.

Figure 7A:
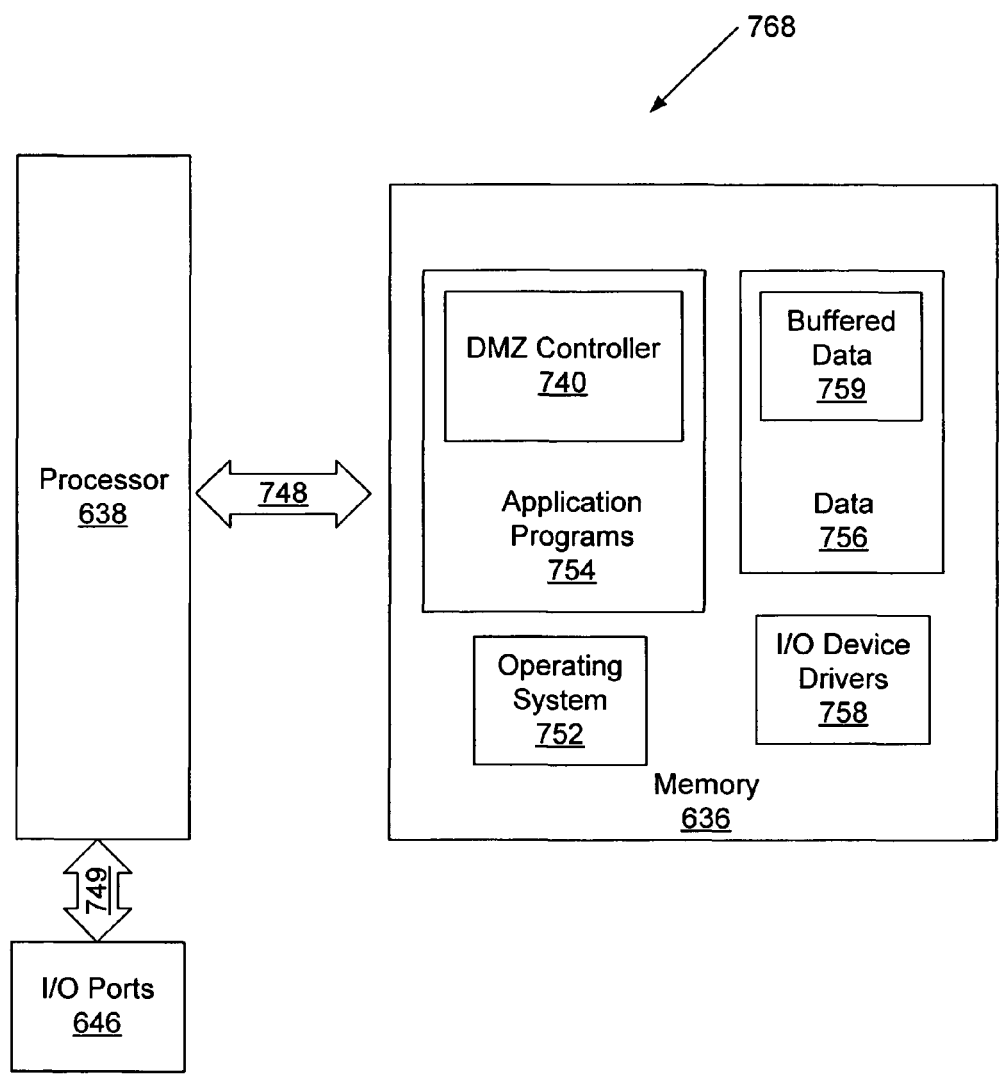
FIG. 7A is a more detailed block diagram of data processing systems suitable for use in DMZ controllers according to some embodiments of the present invention.
Figure 7B:
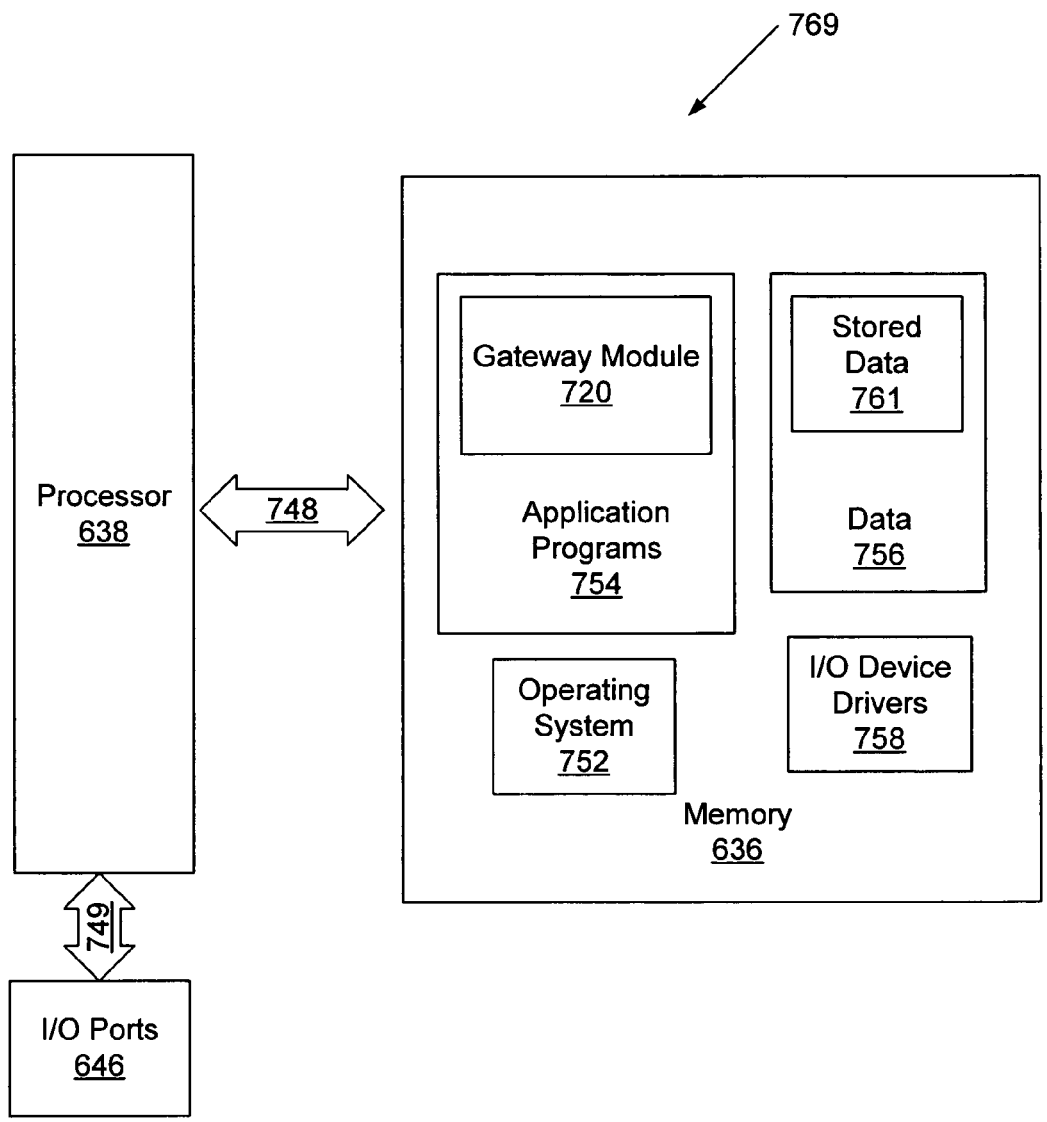
FIG. 7B is a more detailed block diagram of data processing systems suitable for use in gateway modules according to some embodiments of the present invention.

Referring now to FIGS. 7A and 7B, a block diagram of systems 768 and 769 for providing secure communications between a firewall protected area and an NMS that illustrates methods, devices, systems and computer program products in accordance with some embodiments of the present invention will be discussed. As illustrated in FIGS. 7A and 7B, the processor 638 communicates with the memory 636 via an address/data bus 748. The processor 638 can be any commercially available or custom enterprise, application, personal, pervasive and/or embedded microprocessor, microcontroller, digital signal processor or the like. The memory 636 may include any memory devices containing the software and data used to implement the functionality of the data processing system 630. The memory 636 can include, but is not limited to, the following types of devices: ROM, PROM, EPROM, EEPROM, flash memory, SRAM, and DRAM.

As further illustrated in FIGS. 7A and 7B, the memory 636 may include several categories of software and data used in the system 768: an operating system 752; application programs 754; input/output (I/O) device drivers 758; and data 756. As will be appreciated by those of skill in the art, the operating system 752 may be any operating system suitable for use with a data processing system, such as OS/2, AIX or zOS from International Business Machines Corporation, Armonk, N.Y., Windows95, Windows98, Windows2000 or WindowsXP, or Windows CE from Microsoft Corporation, Redmond, Wash., Palm OS, Symbian OS, Cisco IOS, VxWorks, Unix or Linux. The I/O device drivers 758 typically include software routines accessed through the operating system 752 by the application programs 754 to communicate with devices such as the I/O data port(s) 746 and certain memory 636 components. The application programs 754 are illustrative of the programs that implement the various features of the systems 768 and 769 and may include at least one application that supports operations according to embodiments of the present invention. Finally, as illustrated, the data 756 may include buffered data 759 (FIG. 7A) and stored data 761 (FIG. 7B), which may represent the static and dynamic data used by the application programs 754, the operating system 752, the I/O device drivers 758, and other software programs that may reside in the memory 636.

While the present invention is illustrated with reference to a DMZ controller 740 (FIG. 7A) and a gateway module 720 (FIG. 7B) being application programs in FIGS. 7A and 7B, as will be appreciated by those of skill in the art, other configurations fall within the scope of the present invention. For example, rather than being application programs 754, the DMZ controller 740 (FIG. 7A) and the gateway module 720 (FIG. 7B) may also be incorporated into the operating system 752 or other such logical division of the system 768.

Furthermore, while the DMZ controller 740 (FIG. 7A) and the gateway module 720 (FIG. 7B) are illustrated in a single system 768 and 769, respectively, as will be appreciated by those of skill in the art, such functionality may be distributed across one or more systems. Thus, the present invention should not be construed as limited to the configurations illustrated in FIGS. 7A and 7B, but may be provided by other arrangements and/or divisions of functions between data processing systems. For example, although FIGS. 7A and 7B are illustrated as having various circuits, one or more of these circuits may be combined without departing from the scope of the present invention. The functionality of the DMZ controller 740 and the gateway module 720 were discussed above with respect to FIG. 1 and will not be repeated herein in the interest of brevity.

Figure 8:
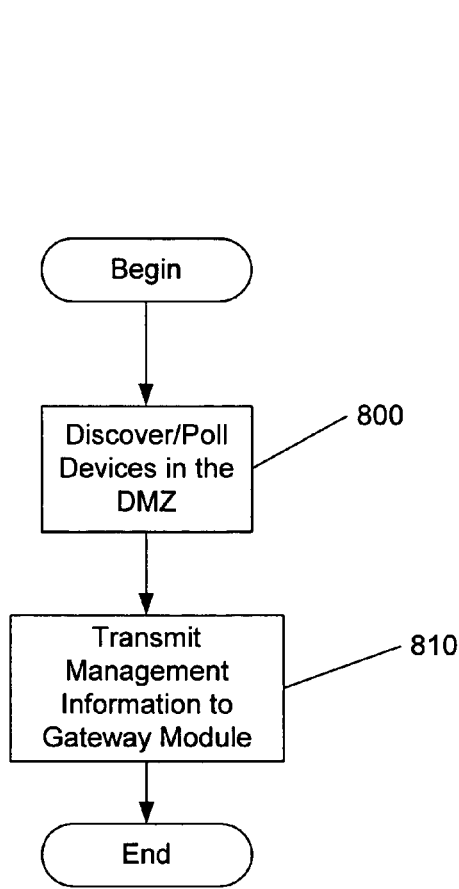
FIG. 8 is a flowchart illustrating operations for providing secure communications between a firewall protected zone and a private network according to some embodiments of the present invention.

Operations according to various embodiments of the present invention will now be discussed with respect to the flowcharts of FIGS. 8 through 12. Referring now to FIG. 8, operations for providing secure communications between a firewall protected area (DMZ) and a network management station (NMS) in a network segregated from the firewall protected area according to some embodiments of the present invention will be discussed. As illustrated in FIG. 8, operations begin at block 800 by discovering, manually configuring and/or polling or passively receiving at least one Managed device in the firewall protected area to obtain management information associated with the at least one Managed device. The discovering and/or polling is performed by a DMZ controller located in the DMZ. In some embodiments of the present invention, the DMZ controller may be, for example, a ZoneRanger product offered by Tavve Software Company.

The obtained management information is transmitted from the DMZ controller through a firewall to a gateway module associated with the NMS (block 810). The communication between the DMZ controller and the gateway module through the firewall may be enabled by a single firewall rule as discussed in detail above. The single firewall rule may be used so as to allow the DMZ controller and the gateway module to initiate connections to each other on tcp/4848 or other applicable port.

In some embodiments of the present invention, the transmission of management information (block 810) may further include managing the flow of transmitted management information. Exemplary management information that may be forwarded to the NMS may include Netflows, sFlows and syslog. In particular, in some embodiments of the present invention, the flow of obtained management information to the gateway module may be throttled so as not to overwhelm the NMS with information. In further embodiments of the present invention, the syntax of the obtained management information may be verified before the management information is transmitted to the gateway module. This may allow "dummy" management information or an attack that may cause problems at the NMS to be filtered before it is sent to the NMS. In still further embodiments of the present invention, the obtained management information may be buffered before forwarding the obtained management information to the gateway module and the buffered management information may be validated before the management information is transmitted to the NMS. In some embodiments of the present invention, a rate of receipt of obtained management information at the DMZ controller may be monitored and the obtained management information may be discarded if the rate exceeds a predefined threshold per source (managed device). As discussed above, the rate at which the management information should be received may be source specific. It will be understood that embodiments of the present invention may include one or more of the flow management techniques discussed above without departing from the scope of the present invention.

Figure 9:
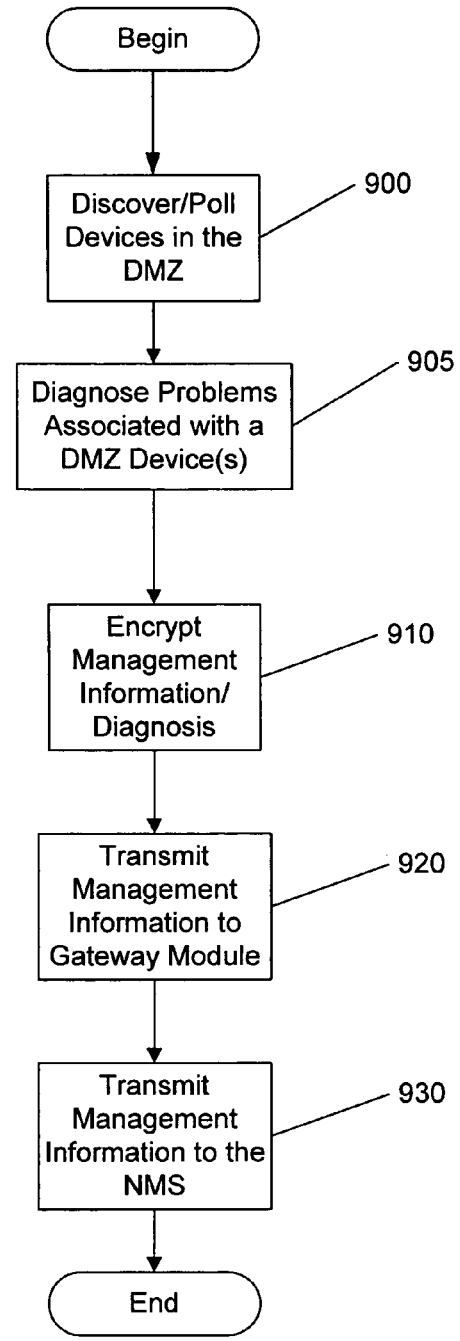
FIG. 9 is a flowchart illustrating operations for providing secure communications between a firewall protected zone and a private network according to further embodiments of the present invention.

Referring now to FIG. 9, operations for providing secure communications between a firewall protected area (DMZ) and a network management station (NMS) in a network segregated from the firewall protected area according to further embodiments of the present invention will be discussed. As illustrated in FIG. 9, operations begin at block 900 by discovering and/or polling at least one Managed device in the firewall protected area to obtain management information associated with the at least one Managed device. The discovering, manually configuring and/or polling is performed by a DMZ controller located in the DMZ. In some embodiments of the present invention, the DMZ controller may be, for example, a ZoneRanger product offered by Tavve Software Company.

The DMZ controller may analyze the management information obtained from the one or more managed devices to diagnose problems associated with the one or more devices (block 905). For example, if a device is not responding, the DMZ controller may diagnose a router between the DMZ controller and the device as causing the problem. The problem diagnosis (management information) may be encrypted (block 910) and transmitted from the DMZ controller through a firewall to a gateway module associated with the network management station (block 920). The communication between the DMZ controller and the gateway module through the firewall may be enabled by a single firewall rule as discussed in detail above. The single firewall rule may be used so as to allow the DMZ controller and the gateway module to initiate connections to each other on tcp/4848 or other applicable port. The gateway module may transmit that management information to the NMS (block 930). In some embodiments of the present invention, the management information may be transmitted to the NMS in the form of a simple network management protocol (SNMP) trap. SNMP traps are discussed above with respect to FIG. 1.

Figure 10:
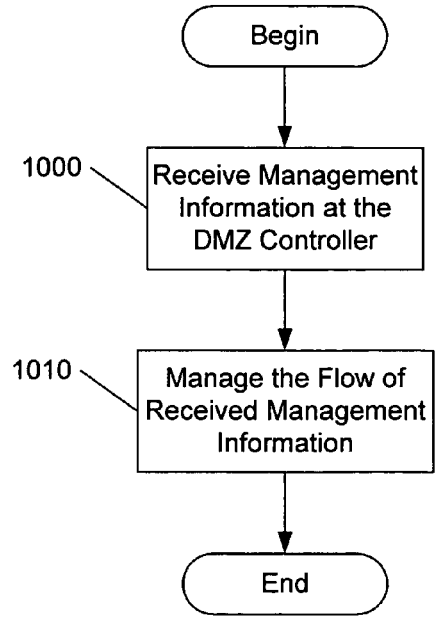
FIG. 10 is a flowchart illustrating operations for providing secure communications between a firewall protected zone and a private network according to still further embodiments of the present invention.

Referring now to FIG. 10, operations for providing secure communications between a firewall protected area (DMZ) and a network management station (NMS) in a network segregated from the firewall protected area according to still further embodiments of the present invention will be discussed. As illustrated in FIG. 10, operations begin at block 1000 by receiving management information associated with at least one Managed device at the DMZ controller. The flow of the received management information may be managed before the management information is transmitted from the DMZ controller through a firewall to a gateway module associated with the network management station (block 1010). By managing the flow of information to the NMS from the DMZ, embodiments of the present invention including flow control mechanisms may provide an added level of security for the private network.

Figure 11:
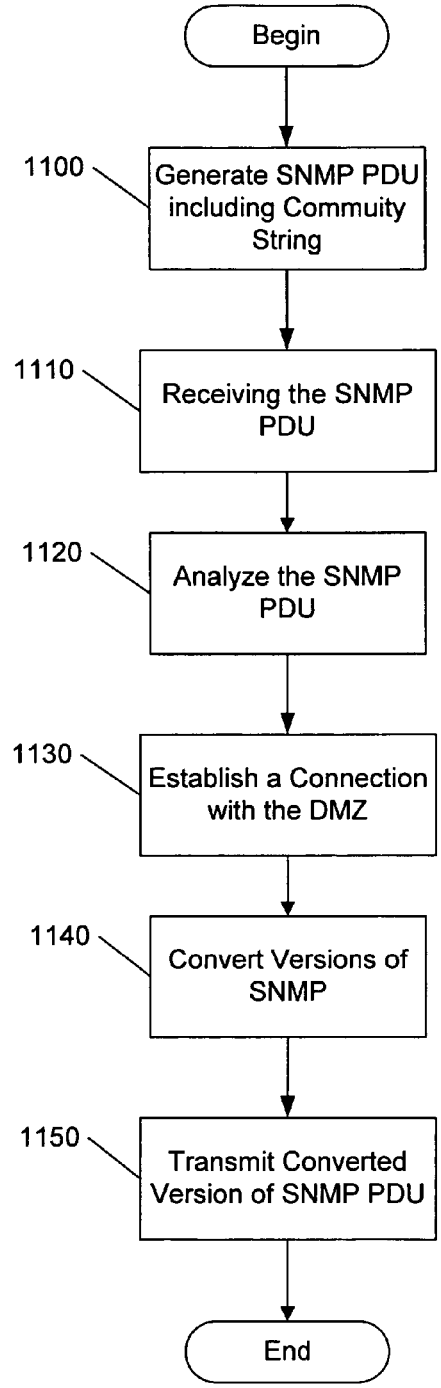
FIG. 11 is a flowchart illustrating operations for communicating simple network management protocol (SNMP) requests between a network management station (NMS) in a network and managed devices in a firewall protected area associated with the network according to some embodiments of the present invention.

Referring now to FIG. 11, operations for communicating simple network management protocol (SNMP) requests between a network management station (NMS) in a network and managed devices in a firewall protected area associated with the network according to some embodiments of the present invention will be discussed. As illustrated in FIG. 11, operations begin at block 1100 by generating a simple management protocol (SNMP) protocol data unit (PDU) at the NMS. The SNMP PDU includes a community string according to some embodiments of the present invention. The community string includes a target community string, an identification of a DMZ controller and a target hostname. In other words, the community string, according to some embodiments of the present invention, does not include any proxy variable bindings. In some embodiments of the present invention, a group of DMZ controllers may be identified in the community string, collectively by a single name rather than a single DMZ controller. Furthermore, in some embodiments of the present invention, the community string may include a port number of the target host. If a port number is not included in the community string, a default port number, for example, udp/161 may be provided.

The generated SNMP PDU may be received at a gateway module from the NMS (block 1110). The SNMP PDU may be analyzed to determine the DMZ controller identified in the community string (block 1120). At this point, the gateway module may convert the SNMP PDU into an intermediate form. A connection may be established with determined DMZ controller identified in the community string (block 1130). Optionally, before transmitting the SNMP PDU to the target device identified by the target hostname in the community string, the DMZ controller may convert the version of the SNMP PDU (block 1140). For example, if the SNMP PDU is received by the gateway module as version 1 or 2C, the DMZ controller may convert the SNMP PDU to version 3, which may be more secure than versions 1 or 2C and, therefore, better for DMZ purposes. The SNMP PDU may be transmitted from the DMZ controller to a target host (managed device) identified by the target hostname in the community string (block 1150).

Figure 12:
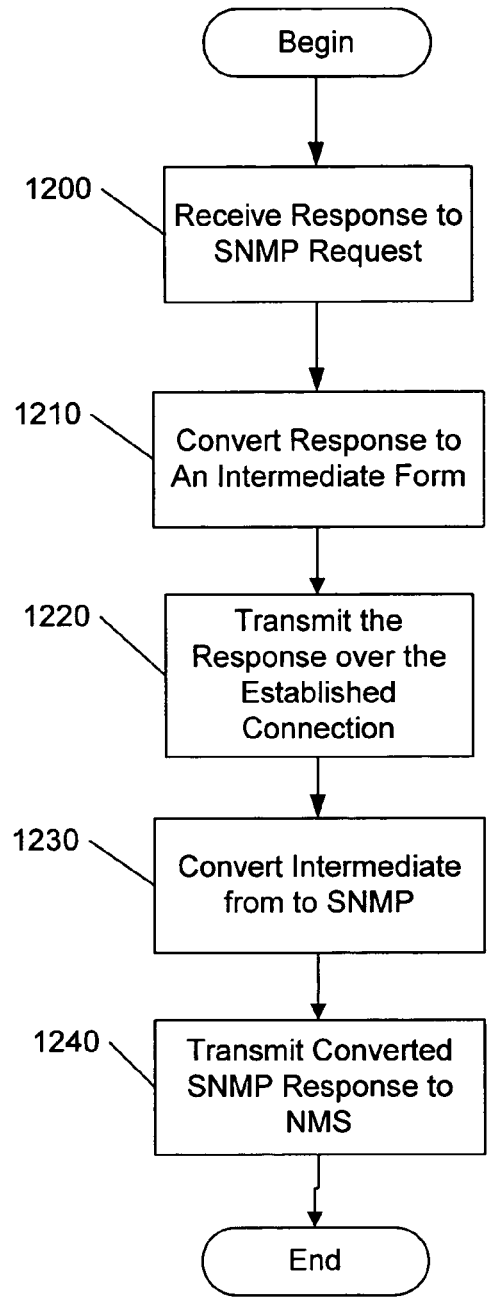
FIG. 12 is a flowchart illustrating operations for communicating SNMP responses between a NMS in a network and managed devices in a firewall protected area associated with the network according to some embodiments of the present invention.

Referring now to FIG. 12, operations for communicating simple network management protocol (SNMP) requests and responses between a network management station (NMS) in a network and managed devices in a firewall protected area associated with the network according to some embodiments of the present invention will be discussed. As illustrated in FIG. 12, operations begin at block 1200 by receiving an SNMP response from the managed device at the DMZ controller. The DMZ controller converts the SNMP PDU (response) to an intermediate form (block 1210) and transmits the intermediate response over the established connection (through the tunnel) to the gateway module (block 1220). The gateway module converts the intermediate form back to an SNMP PDU (response) (block 1230) and transmits the SNMP response to the NMS (SNMP manager) (block 1240). Thus, the SNMP proxy, according to some embodiments of the present invention, receives SNMP on one end and transmits SNMP on the other end.

As discussed above with respect to FIGS. 1 through 12, some embodiments of the present invention provide methods, devices, systems and computer program products for providing secure communications between a firewall protected area and the private network. As discussed above, the DMZ controller in combination with the routing gateway, provide a secure way of communicating management information through a firewall that may be acceptable to both NOC and security personnel.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for providing secure communications between managed devices in a firewall protected area defined by a firewall, wherein the firewall protected area is associated with a private network, and a network management station (NMS) in the private network segregated from the firewall protected area, the firewall protected area being positioned between the private network and a public network, comprising the following carried out by a de-militarized zone (DMZ) controller in the firewall protected area:

obtaining from at least one managed device in the firewall protected area management information associated with the at least one managed device; and transmitting the obtained management information from the DMZ controller through the firewall to a gateway module in the private network associated with the NMS, communications between the DMZ controller and the gateway module being enabled by a single firewall rule.

2. The method of claim 1, wherein transmitting further comprises managing a flow of the obtained management information.

3. The method of claim 2, wherein managing the flow of transmitted status information comprises one or more of:

throttling the flow of the obtained management information to the gateway module;

validating syntax of the obtained management information before transmitting the obtained management information to the gateway module;

buffering the obtained management information and validating the buffered management information before transmitting the buffered management information to the gateway module; and/or monitoring a rate of receipt of the obtained management information at the DMZ controller and discarding the obtained management information if the rate exceeds a predefined threshold per source.

4. The method of claim 1, further comprising transmitting, from the gateway module, the obtained management information to the NMS in the form of a simple network management protocol (SNMP) trap.

5. The method of claim 1, further comprising generating a simple management protocol (SNMP) request in the form of a SNMP protocol data unit (PDU) at the NMS, the SNMP request including a community string including a target community string, an identification of a DMZ controller and a target hostname.

6. The method of claim 5, wherein the identification of the DMZ controller comprises an identification of a plurality of DMZ controllers.

7. The method of claim 5, further comprising:

receiving the SNMP request at the gateway module from the NMS;

analyzing the SNMP request to determine an identity of the DMZ controller identified in the community string;

establishing a connection between the gateway module and the determined DMZ controller identified in the community string; and transmitting, through the determined DMZ controller and using the established connection, the SNMP request to a target host identified by the target hostname in the community string.

8. The method of claim 7, wherein receiving comprises receiving a version 1 or version 2C SNMP PDU, wherein transmitting is preceded by converting the version 1 or version 2C SNMP PDU into a version 3 SNMP PDU and wherein transmitting further comprises transmitting the version 3 SNMP PDU from the determined DMZ controller to the target host.

9. The method of claim 7, further comprising:

receiving an SNMP response in the form of an SNMP PDU from the target host at the DMZ controller;

converting the SNMP response into an intermediate form at the DMZ controller;

transmitting the intermediate form of the SNMP response to the gateway module over the established connection;

converting the intermediate form of the SNMP response back to an SNMP PDU form after receipt at the gateway module; and transmitting the SNMP PDU form of the SNMP response to the NMS.

10. The method of claim 1, further comprising encrypting the obtained management information and wherein transmitting the obtained management information comprises transmitting the encrypted management information through the firewall to the gateway module.

11. The method of claim 1, wherein obtaining is followed by diagnosing problems associated with at least one managed device at the DMZ controller and wherein transmitting further comprises transmitting the diagnosed problems to the gateway module.

12. A method for providing secure communications between managed devices in a firewall protected area defined by a firewall, wherein the firewall protected area is associated with a private network, and a network management station (NMS) in the private network segregated from the firewall protected area, the firewall protected area being positioned between the private network and a public network, comprising:

receiving at a demilitarized zone (DMZ) controller in the firewall protected area, from at least one managed device in the firewall protected area, management information associated with the at least one managed device; and managing a flow of the received management information before transmitting the received management information from the DMZ controller through the firewall to a gateway module in the private network associated with the NMS.

13. The method of claim 12, wherein managing the flow of the received management information comprises one or more of:

throttling the flow of the received management information to the gateway module;

validating syntax of the received management information before transmitting the received management information to the gateway module;

buffering the received management information and validating the buffered management information before transmitting the buffered management information to the gateway module; and/or monitoring a rate of receipt of the received management information at the DMZ controller and discarding the obtained management information if the rate exceeds a predefined threshold per source.

14. A method of communicating simple network management protocol (SNMP) requests and responses through a firewall between a network management station (NMS) in a private network and managed devices in a firewall protected area defined by the firewall associated with the private network, wherein the firewall protected area is associated with the private network and is positioned between the private network and a public network, comprising generating a SNMP request in the form of a protocol data unit (PDU) at the NMS, the SNMP request including a community string including a target community string, an identification of a de-militarized zone (DMZ) controller in the firewall protected area and a target hostname associated with one of the managed devices.

15. The method of claim 14, further comprising:
receiving the SNMP request at a gateway module from the NMS;
analyzing the SNMP request to determine an identity of the DMZ controller identified in the community string;
establishing a connection between the gateway module and the determined DMZ controller identified in the community string; and
transmitting, through the determined DMZ controller and using the established connection, the SNMP request to the managed device identified by the target hostname in the community string.

16. The method of claim 15, wherein receiving comprises receiving a version 1 or version 2C SNMP PDU, wherein transmitting is preceded by converting the version 1 or version 2C SNMP PDU into a version 3 SNMP PDU and wherein transmitting further comprises transmitting the version 3 SNMP PDU from the determined DMZ controller to the target host.

17. The method of claim 15, further comprising:
receiving an SNMP response in the form of an SNMP PDU from the target host at the DMZ controller;
converting the SNMP response into an intermediate form at the DMZ controller;
transmitting the intermediate form of the SNMP response to the gateway module over the established connection;
converting the intermediate form of the SNMP response back to an SNMP PDU form after receipt at the gateway module; and
transmitting the SNMP PDU form of the SNMP response to the NMS.

18. A method for providing secure communications between managed devices in a firewall protected area defined by a firewall, wherein the firewall protected area is associated with a private network, and a network management station (NMS) in the private network segregated from the firewall protected area, the firewall protected area being positioned between the private network and a public network, comprising the following carried out by a gateway module in the private network associated with the NMS:
receiving management information, from a DMZ controller in the firewall protected area through the firewall, the management information being associated with at least one managed device in the firewall protected area and obtained from the at least one managed device, communications between the DMZ controller and the gateway module being enabled by a single firewall rule.

19. A method of communicating simple network management protocol (SNMP) requests and responses through a firewall between a network management station (NMS) in a private network and managed devices in a firewall protected area defined by the firewall associated with the private network, wherein the firewall protected area is associated with the private network and is positioned between the private network and a public network, comprising receiving an SNMP request at a DMZ controller in the form of a protocol data unit (PDU) from the NMS, the SNMP request including a community string including a target community string, an identification of a de-militarized zone (DMZ) controller in the firewall protected area and a target hostname associated with one of the managed devices.

20. A system for providing secure communications between managed devices in a firewall protected area defined by a firewall, wherein the firewall protected area is associated with a private network, and a network management station (NMS) in the private network segregated from the firewall protected area, the firewall protected area being positioned between the private network and a public network, comprising:
a de-militarized zone (DMZ) controller in the firewall protected area configured to obtain management information associated with at least one managed device in the firewall protected area and to transmit the obtained management information through the firewall to a gateway module in the private network associated with the network management station, communications between the DMZ controller and the gateway module being enabled by a single firewall rule.

21. The system of claim 20, wherein the DMZ controller is further configured manage a flow of the obtained management information.

22. The system of claim 21, wherein the DMZ is further configured to:
throttle the flow of the obtained management information to the gateway module;
validate syntax of the obtained management information before transmitting to the obtained management information to the gateway module;
buffer the obtained management information and validate the buffered management information before transmitting the buffered management information to the gateway module; and/or
monitor a rate of receipt of that obtained management information at the DMZ controller and discard the obtained management information if the rate exceeds a predefined threshold per source.

23. The system of claim 20, wherein the NMS is configured to generate a simple network management protocol (SNMP) request in the form of a SNMP protocol data unit (PDU) at the NMS, the SNMP request including a community string including a target community string, an identification of a DMZ controller and a target hostname.

24. The system of claim 23:
wherein the gateway module is further configured to receive the SNMP request at the gateway module from the NMS, analyze the SNMP request to determine an identity of the DMZ controller identified in the community string and establish a connection between the gateway module and the determined DMZ controller identified in the community string; and
wherein the DMZ controller is further configured to transmit the SNMP request to a target host identified by the target hostname in the community string using the established connection.

25. The system of claim 24:
wherein the gateway module is further configured to receive a version 1 or version 2C SNMP PDU; and
wherein the DMZ controller is further configured to convert the version 1 or version 2C SNMP PDU into a version 3 SNMP PDU and transmit the version 3 SNMP PDU to the target host.

26. The system of claim 24:
wherein the DMZ controller is further configured to receive an SNMP response in the form of an SNMP PDU from the target host, convert the SNMP response into an intermediate form at the DMZ controller and transmit the intermediate form of the SNMP response to the gateway module over the established connection; and wherein the gateway controller is further configured to convert the intermediate form of the SNMP response back to an SNMP PDU and transmit the SNMP PDU form of the SNMP response to the NMS.

27. The system of claim 20, wherein the DMZ controller is further configured to encrypt the obtained, management information and transmit the encrypted management information through the firewall to the gateway module.

28. The system of claim 18, wherein the DMZ controller is further configured to diagnose problems associated with at least one managed device and transmit the diagnosed problems to the gateway module.

29. A de-militarized zone (DMZ) controller in a firewall protected area defined by a firewall, wherein the firewall protected area is associated with a private network, for providing secure communications between managed devices in the firewall protected area and a network management station (NMS) in the private network segregated from the firewall protected area, the firewall protected area being positioned between the private network and a public network, the DMZ controller being configured to receive from at least one managed device in the firewall protected area management information associated with the at least one managed device and to manage a flow of the received management information before transmitting the received management information from the DMZ controller through the firewall to a gateway module in the private network associated with the NMS.

30. The DMZ controller of claim 29, wherein the DMZ controller is further configured to:
  throttle the flow of the received management information to the gateway module;
  validate syntax of the received management information before transmitting the received management information to the gateway module;
  buffer the received management information and validate the buffered management information before transmitting the buffered management information to the gateway module; and/or
  monitor a rate of receipt of the received management information at the DMZ controller and discard the obtained management information if the rate exceeds a predefined threshold per source.

31. A system for communicating simple network management protocol (SNMP) requests and responses through a firewall between a network management station (NMS) in a private network and managed devices in a firewall protected area defined by the firewall and associated with the private network, wherein the firewall protected area is associated with the private network and is positioned between the private network and a public network, wherein the NMS is configured to generate a SNMP request in the form of a protocol data unit (PDU), the SNMP request including a community string including a target community string, an identification of a de-militarized zone (DMZ) controller in the firewall protected area and a target hostname associated with one of the managed devices.

32. The system of claim 31:
  wherein the gateway module is further configured to receive the SNMP request at a gateway module from the NMS, analyze the SNMP request to determine an identity of the DMZ controller identified in the community string and establish a connection with the determined DMZ controller identified in the community string; and
  wherein the determined DMZ controller is further configured to transmit the SNMP request to a target host identified by the target hostname in the community string using the established connection.

33. The system of claim 32:
  wherein the gateway module is further configured to receive a version 1 or version 2C SNMP PDU; and
  wherein the DMZ controller is further configured to convert the version 1 or version 2C SNMP PDU into a version 3 SNMP PDU and transmit the version 3 SNMP PDU from the determined DMZ controller to the target host.

34. The system of claim 32:
  wherein the DMZ controller is further configured to receive an SNMP response in the form of an SNMP PDU from the target host, convert the SNMP response into an intermediate form and transmit the intermediate form of the SNMP response to the gateway module over the established connection; and
  wherein the gateway module is further configured to convert the intermediate form of the SNMP response back to an SNMP PDU and transmit the SNMP PDU form of the SNMP response to the NMS.

35. A computer program product, configured to be executed by a processor, for providing secure communications between managed devices in a firewall protected area defined by a firewall, wherein the firewall protected area is associated with a private network, and a network management station (NMS) in the private network segregated from the firewall protected area, the firewall protected area being, positioned between the private network and a public network, the computer program product comprising:
  a computer readable medium having computer readable program code embodied therein, the computer readable program product comprising:
  computer readable program code configured to obtain, from a de-militarized zone (DMZ) controller in the firewall protected area, management information from at least one managed device in the firewall protected area and associated with the at least one managed device; and
  computer readable program code configured to transmit the obtained management information from the DMZ controller through the firewall to a gateway module in the private network associated with the NMS, communications between the DMZ controller and the gateway module being enabled by a single firewall rule.

36. The computer program product of claim 35, wherein the computer readable program code configured to transmit further comprises computer readable program code configured to manage a flow of the obtained management information.

37. The computer program product of claim 36, wherein the computer readable program code configured to manage the flow of transmitted management information comprises one or more of:
  computer readable program code configured to throttle the flow of the obtained management information to the gateway module;
  computer readable program code configured to validate syntax of the obtained management information before transmitting the obtained management information to the gateway module;
  computer readable program code configured to buffer the obtained management information and validate the buffered management information before transmitting the buffered management information to the gateway module; and/or
  computer readable program code configured to monitor a rate of receipt of the obtained management information at the DMZ controller and discard the obtained management information if the rate exceeds a predefined threshold per source.

38. The computer program product of claim 35, further comprising computer readable program code configured to generate a simple management protocol (SNMP) request in the form of a SNMP protocol data unit (PDU) at the NMS, the SNMP PDU including a community string including a target community string, an identification of a DMZ controller and a target hostname.

39. The computer program product of claim 38, further comprising:
 computer readable program code configured to receive the SNMP request at the gateway module from the NMS;
 computer readable program code configured to analyze the SNMP request to determine an identity of the DMZ controller identified in the community string;
 computer readable program code configured to establish a connection between the gateway module and the determined DMZ controller identified in the community string; and
 computer readable program code configured to transmit, through the determined DMZ controller and using the established connection, the SNMP request to a target host identified by the target hostname in the community string.

40. The computer program product of claim 39, wherein the computer readable program code configured to receive comprises computer readable program code configured to receive a version 1 or version 2C SNMP PDU, the computer program product further comprising computer readable program code configured to convert the version 1 or version 2C SNMP PDU into a version 3 SNMP PDU, wherein the computer readable program code configured to transmit further comprises computer readable program code configured to transmit the version 3 SNMP PDU from the determined DMZ controller to the target host.

41. The computer program product of claim 39, further comprising:
 computer readable program code configured to receive an SNMP response in the form of an SNMP PDU from the target host at the DMZ controller;
 computer readable program code configured to convert the SNMP response into an intermediate form at the DMZ controller;
 computer readable program code configured to transmit the intermediate form of the SNMP response to the gateway module over the established connection;
 computer readable program code configured to convert the intermediate form of the SNMP response back to an SNMP PDU form after receipt at the gateway module; and
 computer readable program code configured to transmit the SNMP PDU form of the SNMP response to the NMS.

42. The computer program product of claim 41, further comprising computer readable program code configured to encrypt the obtained management information and wherein the computer readable program code configured to transmit the obtained management information comprises computer readable program code configured to transmit the encrypted management information through the firewall to the gateway module.

43. The computer program product of claim 35, further comprising computer readable program code configured to diagnose problems associated with at least one managed device at the DMZ controller and wherein the computer readable program code configured to transmit further comprises computer readable program code configured to transmit the diagnosed problems to the gateway module.

44. A computer program product, configured to be executed by a processor, for providing secure communications between managed devices in a firewall protected area defined by a firewall, wherein the firewall protected area is associated with a private network, and a network management station (NMS) in the private network segregated from the firewall protected area, the firewall protected area being positioned between the private network and a public network, the computer program product comprising:
 a computer readable medium having computer readable program code embodied therein, the computer readable program product comprising:
 computer readable program code configured to receive at a de-militarized zone (DMZ) controller in the firewall protected area, from at least one managed device in the firewall protected area, management information associated with the at least one managed device; and
 computer readable program code configured to manage a flow of the received management information before transmitting the received management information from the DMZ controller through the firewall to a gateway module in the private network associated with the NMS.

45. The computer program product of claim 44, wherein the computer readable program code configured to manage the flow of the received management information comprises one or more of:
 computer readable program code configured to throttle the flow of the received management information to the gateway module;
 computer readable program code configured to validate syntax of the received management information before transmitting the received management information to the gateway module;
 computer readable program code configured to buffer the received management information and validate the buffered management information before transmitting the buffered management information to the gateway module; and/or
 compute readable program code configured to monitor a rate of the received management information and discard the obtained management information if the rate exceeds a predefined threshold per source.

46. A computer program product, configured to be executed by a processor, for communicating simple network management protocol (SNMP) requests and responses through a firewall between a network management station (NMS) in a private network and managed devices in a firewall protected area defined by the firewall and associated with the private network, wherein the firewall protected area is associated with the private network and is positioned between the private network and a public network, the computer program product comprising:
 a computer readable medium having computer readable program code embodied therein, the computer readable program product comprising:
 computer readable program code configured to generate a SNMP request in the form of a protocol data unit (PDU) at the NMS, the SNMP request including a community string including a target community string, an identification of a de-militarized zone (DMZ) controller in the firewall protected area and a target hostname associated with one of the managed devices.

47. The computer program product of claim 46, further comprising:

computer readable program code configured to receive the SNMP request at a gateway module from the NMS;

computer readable program code configured to analyze the SNMP request to determine an identity of the DMZ controller identified in the community string;

computer readable program code configured to establish a connection with the determined DMZ controller identified in the community string; and computer readable program code configured to transmit, through the determined DMZ controller using the established connection, the SNMP request to a target host identified by the target hostname in the community string.

48. The computer program product of claim 47, wherein the computer readable program code configured to receive comprises computer readable program code configured to receive a version 1 or version 2C SNMP PDU, wherein the computer program product further comprises computer readable program code configured to convert the version 1 or version 2C SNMP PDU into a version 3 SNMP PDU, wherein computer readable program code configured to transmit further comprises computer readable program code configured to transmit the version 3 SNMP PDU from the determined DMZ controller to the target host.

49. The computer program product of claim 47, further comprising:

computer readable program code configured to receive an SNMP response in the form of an SNMP PDU from the target host at the DMZ controller;

computer readable program code configured to convert the SNMP response into an intermediate form at the DMZ controller;

computer readable program code configured to transmit the intermediate form of the SNMP response to the gateway module over the established connection;

computer readable program code configured to convert the intermediate form of the SNMP response back to an SNMP PDU; and computer readable program code configured to transmit the SNMP PDU form of the SNMP response to the NMS.

* * * * *

UNITED STATES PATENT AND TRADEMARK OFFICE
CERTIFICATE OF CORRECTION

PATENT NO.        : 8,701,175 B2
APPLICATION NO.   : 11/069484
DATED             : April 15, 2014
INVENTOR(S)       : Edwards et al.

Page 1 of 1

It is certified that error appears in the above-identified patent and that said Letters Patent is hereby corrected as shown below:

In the Claims:
Column 23, Claim 27, Line 6: Delete "the obtained, management"
and insert -- the obtained management --

Column 24, Claim 35, Lines 27-28: Delete "area being, positioned"
and insert -- area being positioned --

Signed and Sealed this
Fourteenth Day of October, 2014

Michelle K. Lee
*Deputy Director of the United States Patent and Trademark Office*